United States Patent
Okada et al.

(10) Patent No.: US 8,641,202 B2
(45) Date of Patent: Feb. 4, 2014

(54) PROJECTION DISPLAY DEVICE

(75) Inventors: Hisashi Okada, Daito (JP); Kazuya Minami, Hirakata (JP); Yosuke Nishihata, Osaka (JP); Yuji Matsuyama, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 443 days.

(21) Appl. No.: 12/551,833

(22) Filed: Sep. 1, 2009

(65) Prior Publication Data

US 2010/0053568 A1      Mar. 4, 2010

(30) Foreign Application Priority Data

Sep. 3, 2008   (JP) ................. 2008-225997

(51) Int. Cl.
  *G03B 21/18* (2006.01)
  *G03B 21/16* (2006.01)
  *G02F 1/1333* (2006.01)

(52) U.S. Cl.
  USPC ............................. 353/61; 349/58; 349/161

(58) Field of Classification Search
  USPC ............ 353/61, 60, 57, 58, 52, 119; 362/294, 362/373, 264; 348/748; 349/58, 161; 347/57
  See application file for complete search history.

(56) References Cited

U.S. PATENT DOCUMENTS

| | | | | |
|---|---|---|---|---|
| 5,682,216 A | * | 10/1997 | Lin et al. | 349/122 |
| 2004/0223237 A1 | * | 11/2004 | Yanagisawa et al. | 359/820 |
| 2004/0246398 A1 | * | 12/2004 | Kojima et al. | 349/58 |

FOREIGN PATENT DOCUMENTS

| | | | |
|---|---|---|---|
| JP | 10-197954 A | | 7/1998 |
| JP | 11295814 A | * | 10/1999 |
| JP | 2001-264883 A | | 9/2001 |
| JP | 2003-241315 A | | 8/2003 |
| JP | 2004-061894 A | | 2/2004 |

OTHER PUBLICATIONS

Notification of Reasons for Refusal, Japan Patent Application No. 2008-225997, dated Oct. 2, 2012, with machine translation (pp. 7).
Decision of Final Rejection dated Mar. 12, 2013, issued in corresponding Japanese Patent Application No. 2008-225997, with English translation (5 pages).

* cited by examiner

*Primary Examiner* — William C Dowling
*Assistant Examiner* — Ryan Howard
(74) *Attorney, Agent, or Firm* — Westerman, Hattori, Daniels & Adrian, LLP

(57) ABSTRACT

A projection display device includes: a light modulator for modulating light from a light source; a polarizer disposed at a position facing the light modulator; a cooling section for allowing an air to flow in a space between the light modulator and the polarizer; and an air deflector for deflecting the air flowing in the space between the light modulator and the polarizer toward the polarizer.

3 Claims, 9 Drawing Sheets

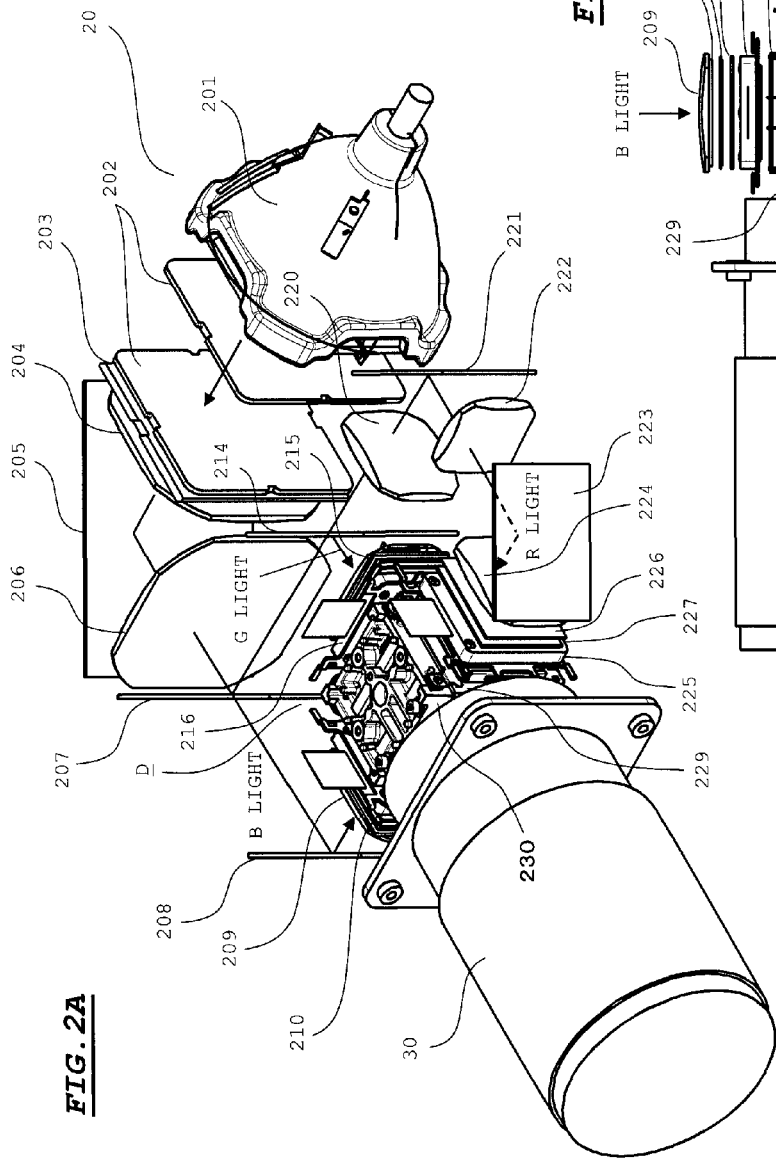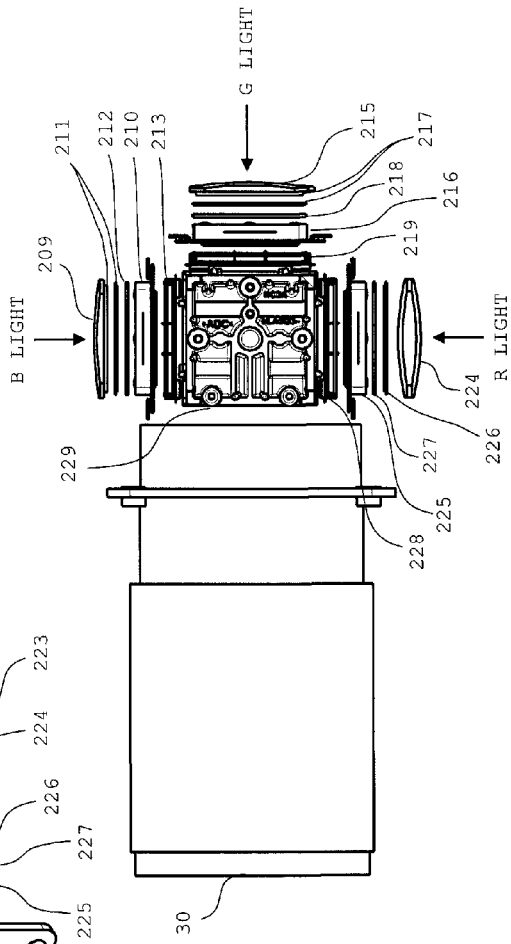

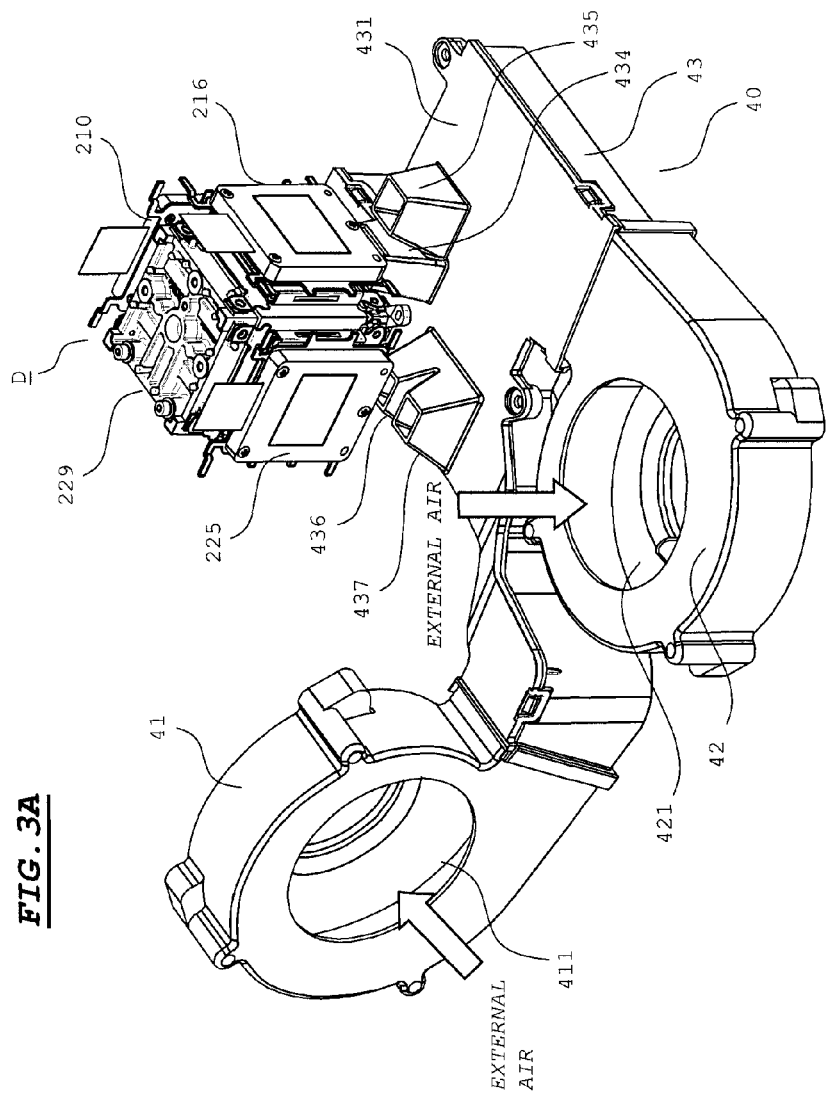
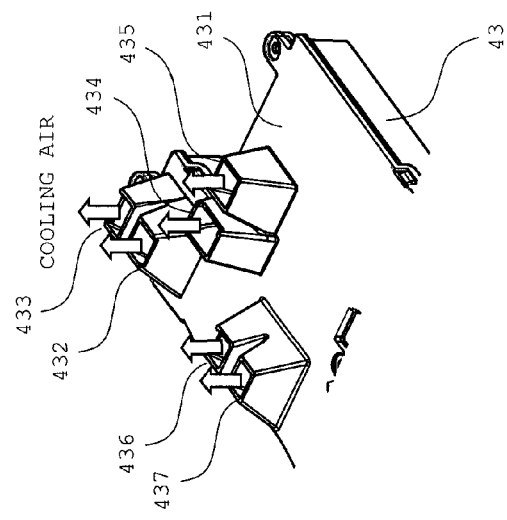
FIG. 3A
FIG. 3B

A SECTIONAL VIEW TAKEN ALONG THE LINE A-A'

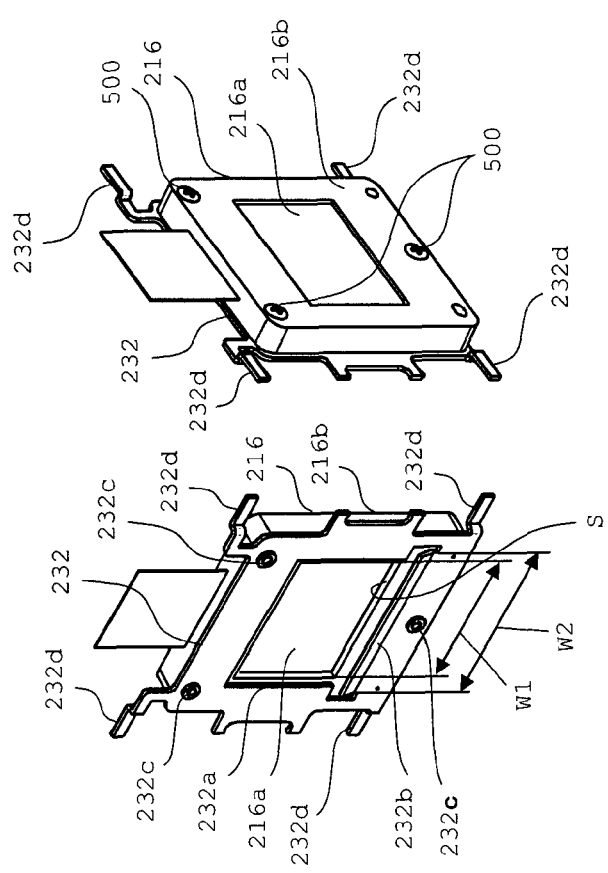
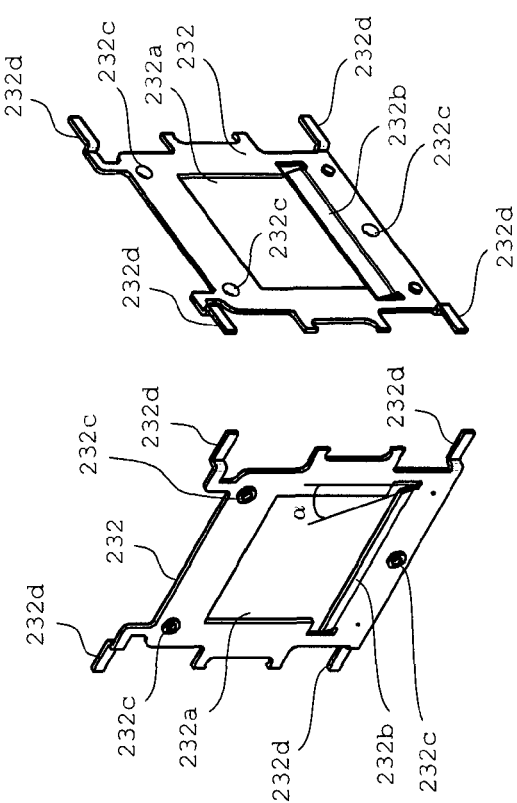
FIG. 5A
FIG. 5B

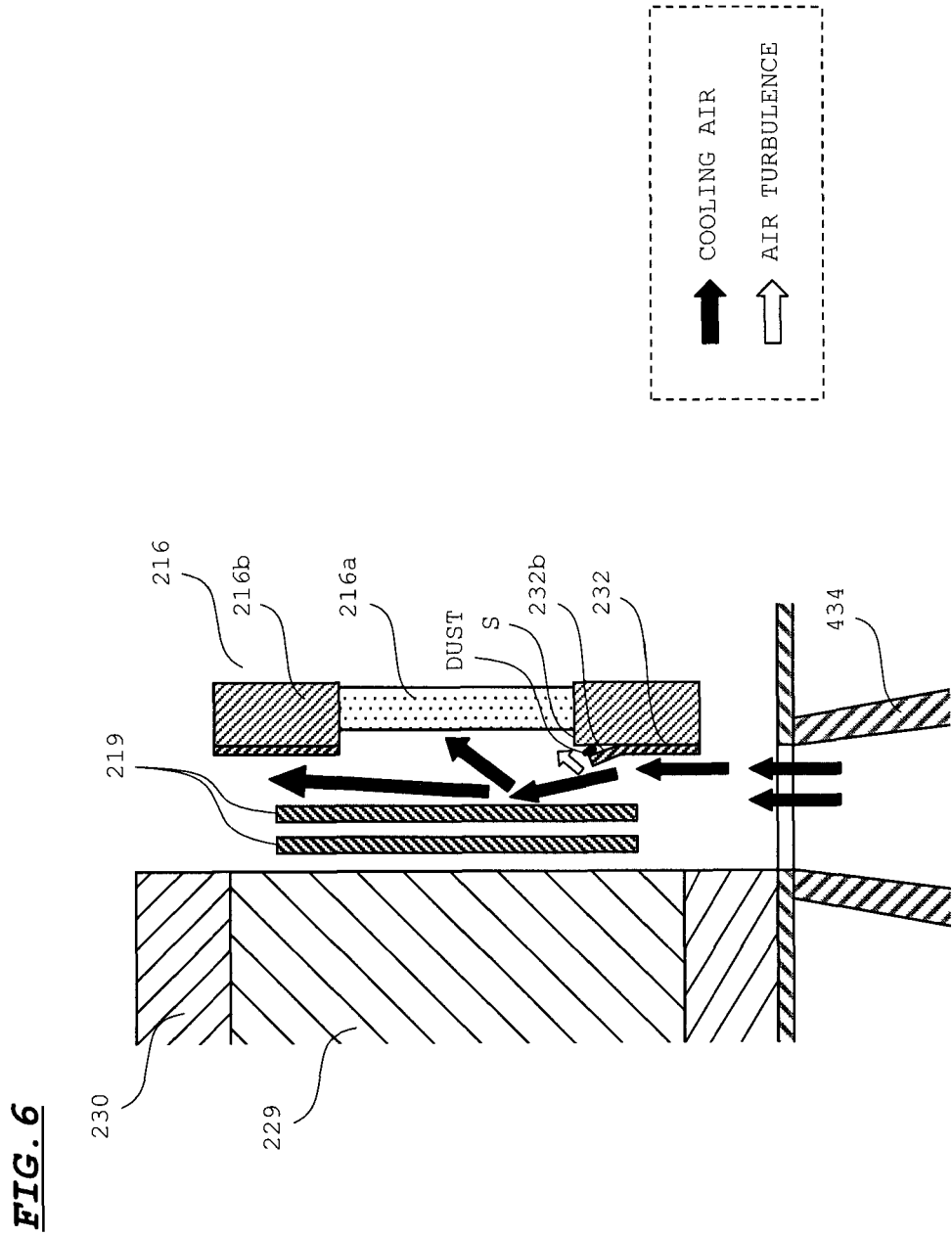

PROJECTION DISPLAY DEVICE

This application claims priority under 35 U.S.C. Section 119 of Japanese Patent Application No. 2008-225997 filed Sep. 3, 2008, entitled "PROJECTION DISPLAY DEVICE". The disclosers of the above applications are incorporated herein by reference.

BACKGROUND OF THE INVENTION

1. Field of the Invention

The present invention relates to a projection display device for projecting light modulated by an imager onto a projection plane.

2. Description of the Related Art

A projection display device (hereinafter, called as a "projector") is constructed in such a manner that light from a light source is modulated by a light modulator constituted of an imager (such as a liquid crystal panel) to project the modulated light (hereinafter called as "image light") onto a projection plane. Polarizers are disposed on an incident side and an exit side of the light modulator. A large amount of heat is generated from the light modulator and the polarizers when light is passed through the light modulator and the polarizers. In particular, a largest amount of heat is generated from the polarizer on the exit side of the light modulator.

In view of the above, a conventional projector is designed to cool the light modulator and the polarizers by cooling air.

FIG. 9 is a diagram showing an example of a cooling structure for a light modulator and polarizers.

Two output-side polarizers 2 are disposed on the exit side of a light modulator 1. A dichroic prism 3 is disposed on the exit side of the output-side polarizers 2. A support member 4 is mounted on a surface of the light modulator 1 at a position facing the output-side polarizers 2.

An air outlet port 5 is formed at a position below the light modulator 1 and the output-side polarizers 2. Cooling air generated by an unillustrated fan is blown through the air outlet port 5. The cooling air is mainly allowed to flow in a space between the light modulator 1 and the output-side polarizers 2. Therefore, the light modulator 1 and the output-side polarizers 2 are cooled.

Although not illustrated, another two sets of a light modulator 1 and output-side polarizers 2 are disposed on the other two surfaces of the dichroic prism 3 respectively to modulate light of a red wavelength band, light of a green wavelength band, and light of a blue wavelength band. In this example, only the cooling structure for one set of the light modulator 1 and the output-side polarizers 2 is shown. However, the cooling structures for the other two sets of the light modulator 1 and the output-side polarizers 2 are substantially the same as the cooling structure for the one set.

As shown in FIG. 9, the light modulator 1 includes an imager (liquid crystal panel) 1a, and a frame 1b surrounding the perimeter of the imager 1a. It is often the case that the lateral thickness of the frame 1b is set larger than the thickness of the imager 1a. In this case, a step portion S is formed between the imager 1a and the frame 1b on the exit side of the light modulator 1.

In the above arrangement, when cooling air (indicated by the black arrows in FIG. 9) is allowed to flow in a space between the light modulator 1 and the output-side polarizers 2, air turbulence (indicated by the white arrow in FIG. 9) is generated around the step portion S. As a result, dirt or dust contained in the cooling air may stagnate on the step portion S, and smear a periphery of the imager 1a. Therefore, an illuminance of image light which has been passed through the smeared periphery of the imager 1a may be lowered, or discoloration may appear.

In recent years, as the light amount of a light source has been increased due to high luminance of image light, the amount of heat generated on or around the light modulator 1 has been increasing. In view of this, it is necessary to increase the flow rate of cooling air, which may likely to cause deterioration of a projected image due to adhesion of dust or a like matter.

SUMMARY OF THE INVENTION

In view of the above, an object of the invention is to provide a projection display device capable of suppressing adhesion of dust or a like matter on an imager (liquid crystal panel), and suppressing image deterioration due to the dust adhesion.

A projection display device according to a primary aspect of the invention includes: a light modulator for modulating light from a light source; a polarizer disposed at a position facing the light modulator; a cooling section for allowing an air to flow in a space between the light modulator and the polarizer; and an air deflector for deflecting the air flowing in the space between the light modulator and the polarizer toward the polarizer.

According to the above arrangement, the air flowing in the space between the light modulator and the polarizer is deflected toward the polarizer. In this arrangement, even if the light modulator has a step portion or a like portion, air turbulence is less likely to occur around the step portion, and dust or a like matter is less likely to stagnate on the step portion.

BRIEF DESCRIPTION OF THE DRAWINGS

The foregoing and other objects and novel features of the present invention will become more apparent upon reading the following detailed description of the embodiment along with the accompanying drawings.

FIGS. 2A and 2B are diagrams showing an internal arrangement of an optical engine in the embodiment.

FIGS. 3A and 3B are diagrams showing an arrangement of a cooling device in the embodiment.

FIGS. 5A and 5B are diagrams showing an arrangement of a light modulator and a bracket in the embodiment.

FIG. 6 is a diagram for describing a flow of cooling air in a space between the light modulator and output-side polarizers in the embodiment.

Figure 1:
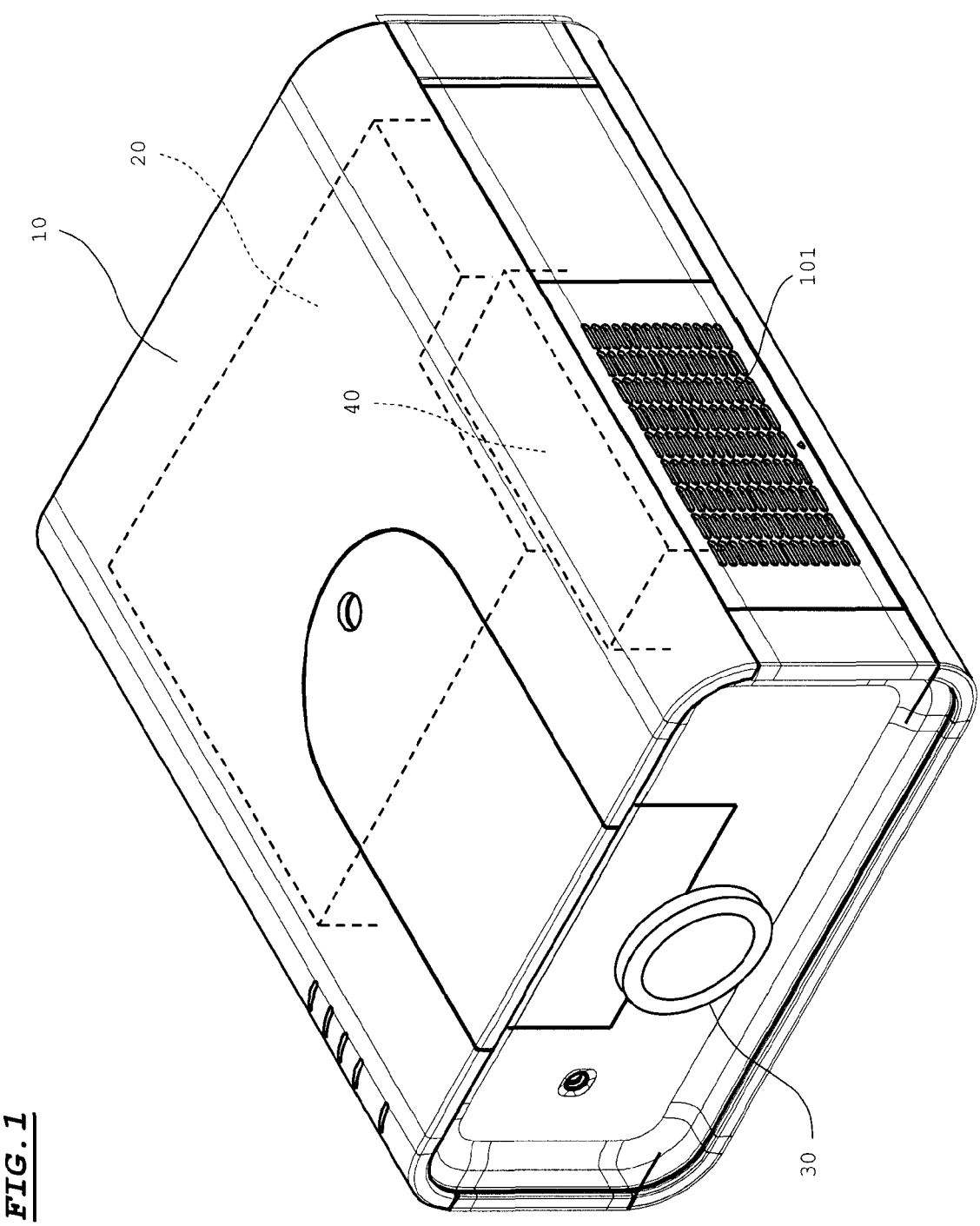
FIG. 1 is a diagram showing an arrangement of a projector in accordance with an embodiment of the invention.

The drawings are provided mainly for describing the present invention, and do not limit the scope of the present invention.

DESCRIPTION OF THE PREFERRED EMBODIMENTS

In the following, an arrangement of a projector embodying the invention is described referring to the drawings.

FIG. 1 is a diagram (external perspective view) showing an arrangement of a projector. Referring to FIG. 1, the projector includes a cabinet 10. The cabinet 10 has a substantially parallelepiped shape with a vertically small size and a transversely long size. An air inlet port 101 for drawing the external air into the cabinet 10 is formed in a side wall of the cabinet 10.

The cabinet 10 is internally provided with an optical engine 20, a projection lens 30, and a cooling device 40. The optical engine 20 generates image light modulated by an image signal. The projection lens 30 is mounted on the optical engine 20. A front portion of the projection lens 30 is exposed from a front wall of the cabinet 10. Image light generated by the optical engine 20 is projected onto a screen plane disposed in front of the projector through the projection lens 30. The cooling device 40 supplies the external air drawn into the cabinet 10 through the air inlet port 101 onto light modulators (to be described later) and peripheries thereof in the optical engine 20, as cooling air.

FIGS. 2A and 2B are diagrams showing an internal arrangement of the optical engine 20. FIG. 2A is a perspective view showing the optical engine 20 and the projection lens 30 in a state that a housing is omitted. FIG. 2B is a top plan view showing constituent parts in the periphery of the light modulators in the optical engine 20, and the projection lens 30.

Various optical parts of the optical engine 20 to be described in the following are arranged in the unillustrated housing.

A white light lamp 201 (corresponding to a light source in the claimed invention) emits white light. The light emitted from the white light lamp 201 is passed through a fly-eye integrator 202 and a PBS array 203. The fly-eye integrator 202 makes the light amount distribution of light of respective colors to be irradiated onto the light modulators (to be described later) uniform. The PBS array 203 aligns polarizing directions of light directing toward a dichroic mirror 207 in one direction.

The light which has been passed through the PBS array 203 is passed through a condenser lens 204 and reflected on a reflection mirror 205 substantially at a right angle. The light reflected on the reflection mirror 205 is passed through a condenser lens 206 and incident into the dichroic mirror 207.

The dichroic mirror 207 transmits solely light of a blue wavelength band (hereinafter, called as "B light"), out of the incident light, and reflects light of a green wavelength band (hereinafter, called as "G light") and light of a red wavelength band (hereinafter, called as "R light").

The B light transmitted through the dichroic mirror 207 is irradiated onto a light modulator 210 in a proper irradiated state by a lens function of the condenser lens 204, the condenser lens 206, and a condenser lens 209, and reflection on a reflection mirror 208. The light modulator 210 is driven in accordance with an image signal of blue to modulate the B light depending on a driven state thereof. A pair of incident-side polarizers 211 and an optical compensator 212 are disposed on the incident side of the light modulator 210. The B light is irradiated onto the light modulator 210 via the incident-side polarizer pair 211 and the optical compensator 212. Further, a pair of output-side polarizers 213 is disposed on the exit side of the light modulator 210. The B light emitted from the light modulator 210 is incident into the output-side polarizer pair 213.

The G light and the R light reflected on the dichroic mirror 207 are incident into a dichroic mirror 214. The dichroic mirror 214 reflects the G light and transmits the R light.

The G light reflected on the dichroic mirror 214 is irradiated onto a light modulator 216 in a proper irradiated state by a lens function of the condenser lens 204, the condenser lens 206, and a condenser lens 215. The light modulator 216 is driven in accordance with an image signal of green to modulate the G light depending on a driven state thereof. A pair of incident-side polarizers 217 and an optical compensator 218 are disposed on the incident side of the light modulator 216. The G light is irradiated onto the light modulator 216 via the incident-side polarizer pair 217 and the optical compensator 218. Further, a pair of output-side polarizers 219 is disposed on the exit side of the light modulator 216. The G light emitted from the light modulator 216 is incident into the output-side polarizer pair 219.

The R light transmitted through the dichroic mirror 214 is irradiated onto a light modulator 225 in a proper irradiated state by a lens function of the condenser lens 204, the condenser lens 206, and a condenser lens 222, and relay lenses 220 and 224, and reflection on reflection mirrors 221 and 223. The light modulator 225 is driven in accordance with an image signal of red to modulate the R light depending on a driven state thereof. An incident-side polarizer 226 and an optical compensator 227 are disposed on the incident side of the light modulator 225. The R light is irradiated onto the light modulator 225 via the incident-side polarizer 226 and the optical compensator 227. Further, a pair of output-side polarizers 228 is disposed on the exit side of the light modulator 225. The R light emitted from the light modulator 225 is incident into the output-side polarizer pair 228.

The B light, the G light, and the R light modulated by the light modulators 210, 216, and 225 are passed through the output-side polarizer pairs 213, 219, and 228, and are incident into a dichroic prism 229. The dichroic prism 229 reflects the B light and the R light, out of the B light, G light, and the R light, and transmits the G light, whereby the B light, the G light, and the R light are combined into image light. Then, the combined image light is emitted from the dichroic prism 229 toward the projection lens 30.

Figure 4B:
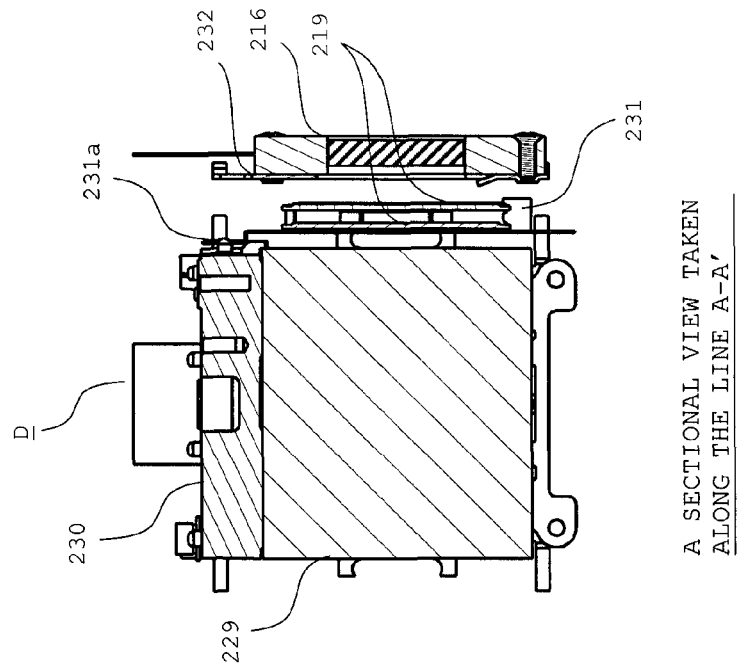
FIGS. 4A and 4B are diagrams showing an arrangement of a display unit in the embodiment.
Figure 4A:
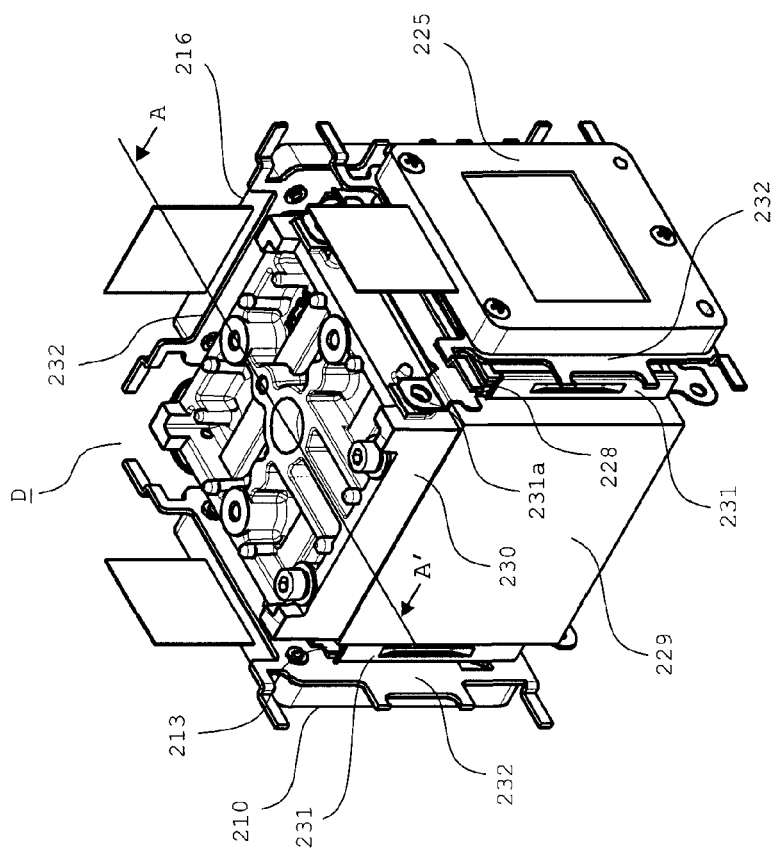

The light modulators 210, 216, 225, the output-side polarizer pairs 213, 219, 228, and the dichroic prism 229 are assembled into a display unit D on a holding member 230 shown in FIG. 4A.

FIGS. 3A and 3B are diagrams showing an arrangement of the cooling device 40. FIG. 3A is a perspective view of the cooling device 40, and FIG. 3B is a perspective view of essential parts of an air feeding duct 43. In FIG. 3A, only the display unit D of the optical engine 20 is shown with the cooling device 40 for simplifying the description.

The cooling device 40 (corresponding to a cooling section in the claimed invention) is constituted of two air-intake fans 41 and 42, and the air feeding duct 43. The air-intake fans 41 and 42 are disposed inside the cabinet 10 at positions near the air inlet port 101. The air-intake fans 41 and 42 are respectively formed with air-intake openings 411 and 421 through which the external air drawn through the air inlet port 101 is guided to the air feeding duct 43.

The air feeding duct 43 has a duct body 431. The duct body 431 is disposed below the optical engine 20. A first air outlet port 432 and a second air outlet port 433 are formed on a top surface of the duct body 431 at positions below the light modulator 210 for B light. Likewise, a first air outlet port 434 and a second air outlet port 435 are formed on the top surface of the duct body 431 at positions below the light modulator 216 for G light. Likewise, a first air outlet port 436 and a second air outlet port 437 are formed on the top surface of the duct body 431 at positions below the light modulator 225 for R light.

Cooling air is blown toward the light modulator 210 and the output-side polarizer pair 213, the light modulator 216 and the output-side polarizer pair 219, and the light modulator 225 and the output-side polarizer pair 228 through the first air outlet ports 432, 434, and 436, respectively. On the other hand, cooling air is blown toward the incident-side polarizer pair 211 and the optical compensator 212, the incident-side polarizer pair 217 and the optical compensator 218, and the incident-side polarizer 226 and the optical compensator 227 through the second air outlet ports 433, 435, and 437, respectively.

A flow channel is defined inside the duct body 431 in such a manner that the flow rates through the respective air outlet ports are regulated. In this embodiment, the flow rates through the first air outlet ports 432, 434, and 436 are set larger than the flow rates through the second air outlet ports 433, 435, and 437. The flow rates are regulated as described above, because the amounts of heat generated on or around the light modulators 210, 216, and 225, and the output-side polarizer pairs 213, 219, and 228 are large. Further, the flow rates are regulated in such a manner that the flow rates are increased in the order of the first air outlet port 434 for G light, the first air outlet port 432 for B light, and the first air outlet port 436 for R light. This is because the amount of heat generated by a modulating operation is increased in the order of G light, B light, and R light.

FIGS. 4A and 4B are diagrams showing an arrangement of the display unit D. FIG. 4A is a perspective view of the display unit D, and FIG. 4B is a sectional view taken along the line A-A' in FIG. 4A.

The holding member 230 is mounted on a top surface of the dichroic prism 229. The output-side polarizer pairs 213, 219, and 228 are held on three holders 231, respectively. As shown in FIG. 4B, the output-side polarizer pair 219 is held on the corresponding holder 231 in a state that the corresponding two polarizers are spaced away from each other by a predetermined clearance. Also, the output-side polarizer pair 213, 228 is held on the corresponding holder 231 in the same manner as the output-side polarizer pair 219. Each of the holders 231 supports bottom surfaces of the corresponding two polarizers, and holds the two polarizers between side portions of the holder 231. An engaging piece 231a is formed on an upper portion of each of the holders 231. Fixing the engaging pieces 231a on the holding member 230 by soldering or a like process enables to integrally assemble the holders 231 with the holding member 230.

Brackets 232 (corresponding to a support member and an air deflector in the claimed invention) are mounted on exit surfaces of the light modulators 210, 216, and 225, respectively.

FIGS. 5A and 5B are diagrams showing an arrangement of the light modulator 216 and the corresponding bracket 232. FIG. 5A is a perspective view (diagram viewed from front and rear directions) showing a state that the light modulator 216 is mounted on the bracket 232, and FIG. 5B is a perspective view (diagram viewed from front and rear directions) of the bracket 232. In this section, description is made on the light modulator 216 for G light and the corresponding bracket 232. It should be noted, however, that the arrangement on the light modulator 210 and the corresponding bracket 232, and the arrangement on the light modulator 225 and the corresponding bracket 232 are substantially the same as the arrangement on the light modulator 216 and the corresponding bracket 232.

The light modulator 216 includes a transmissive liquid crystal panel 216a, and a frame 216b surrounding the perimeter of the liquid crystal panel 216a. The lateral thickness of the frame 216b is set larger than the thickness of the liquid crystal panel 216a. Accordingly, a step portion S is formed between the liquid crystal panel 216a and the frame 216b on the exit side of the light modulator 216.

The bracket 232 is made of a metal, and an opening 232a corresponding to the liquid crystal panel 216a is formed in the middle of the bracket 232. An inclined piece 232b (corresponding to a flow deflecting portion in the claimed invention) is formed on the bracket 232 at a position corresponding to a lower perimeter of the opening 232a. The transverse width W2 of the inclined piece 232b is set longer than the transverse width W1 of the liquid crystal panel 216a. As will be described later in detail, the tilt angle $\alpha$ of the inclined piece 232b with respect to the main body of the bracket 232 is defined in advance, based on an experiment or a like approach, to such a value that cooling air guided by the inclined piece 232b impinges on a middle portion of the output-side polarizer pair 219.

Three threaded holes 232c are formed in the bracket 232. The light modulator 216 is fixed to the bracket 232 by fastening three screws 500 in the threaded holes 232c. The bracket 232 is formed with four attachment portions 232d at respective four corners thereof. Fixing the attachment portions 232d on predetermined respective sites (not shown) of the holder 231 by soldering or a like process enables to integrally assemble the light modulator 216 with the holding member 230 and the output-side polarizer pair 219.

FIG. 6 is a diagram for describing a flow of cooling air with respect to a light modulator and an output-side polarizer pair. In the following, a flow of cooling air with respect to the light modulator 216 for G light and the output-side polarizer pair 219 is described. It should be noted, however, that a flow of cooling air with respect to the light modulator 210 and the output-side polarizer pair 213, and the light modulator 225 and the output-side polarizer pair 228 are substantially the same as the flow of cooling air with respect to the light modulator 216 and the output-side polarizer pair 219.

In response to driving of the air intake fans 41 and 42, cooling air is blown through the first air outlet port 434. The cooling air is allowed to flow in a space between the light modulator 216 and the output-side polarizer pair 219. In the blowing operation, the cooling air (indicated by the black arrows in FIG. 6) flowing on the side of the bracket 232 impinges on the inclined piece 232b before reaching in the vicinity of the step portion S, and is guided toward the output-side polarizer pair 219 along a slope (corresponding to a guide surface in the claimed invention) of the inclined piece 232b. Then, the cooling air impinges on the middle portion of the output-side polarizer pair 219, and is allowed to flow upwardly along the output-side polarizer pair 219. Further, a part of the cooling air which has impinged on the output-side polarizer pair 219 is guided toward the liquid crystal panel 216a, and impinges on the liquid crystal panel 216a.

In this way, cooling air guided by the inclined piece 232b efficiently impinges on the output-side polarizer pair 219, and thus the output-side polarizer pair 219 is efficiently cooled.

Further, since the cooling air also efficiently impinges on the liquid crystal panel 216a, the liquid crystal panel 216a i.e. the light modulator 216 is also efficiently cooled.

Air turbulence may generate in the vicinity of a distal end of the inclined piece 232b, and dust or dirt contained in the cooling air may stagnate on the distal end of the inclined piece 232b. However, dust or a like matter is mainly adhered on a backside surface of the distal end of the inclined piece 232b, and is less likely to adhere on the step portion S i.e. a lower end of the liquid crystal panel 216b.

As described above, according to the embodiment, the effect of cooling the light modulators 210, 216, and 225, and the output-side polarizer pairs 213, 219, and 228 can be enhanced. In particular, since the tilt angle α of the inclined piece 232b is set to such a value that cooling air impinges on the middle portions of the output-side polarizer pairs 213, 219, and 228 which are likely to be heated, the output-side polarizer pairs 213, 219, and 228 can be effectively cooled.

Also, according to the embodiment, since generation of air turbulence around the step portion S between the liquid crystal panel 216a and the frame 216b is suppressed, dust or a like matter is less likely to adhere on the light modulator (liquid crystal panel) 210, 216, 225. Thereby, deterioration of a projected image resulting from dust adhesion can be suppressed.

Further, according to the embodiment, the cooling effect can be enhanced, and deterioration of a projected image can be suppressed with a simplified structure of forming the inclined pieces 232b on the brackets 232 for supporting the light modulators 210, 216, and 225.

Figure 7:
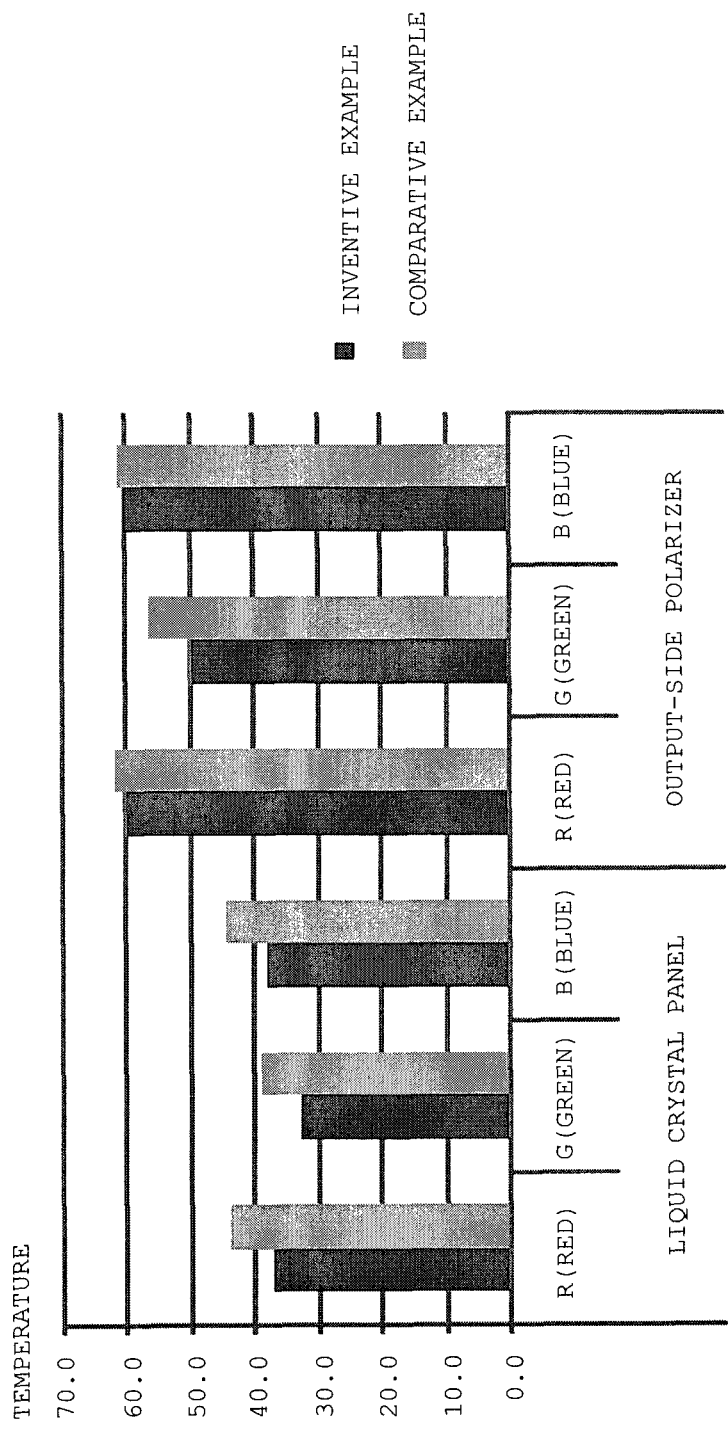
FIG. 7 is a graph showing a temperature measurement result on light modulators (liquid crystal panels) and output-side polarizer pairs at the time of operating the projector, in the case where a cooling structure (inventive example) of the embodiment, and a cooling structure (comparative example) of the related art were used.

FIG. 7 is a graph showing a temperature measurement result on light modulators (liquid crystal panels) and output-side polarizer pairs at the time of operating the projector, in the case where the cooling structure (inventive example) of the embodiment and the cooling structure (comparative example) of the related art were used. The projector was installed in an upright state (a state that the bottom portion of the projector was placed on an installation plane), and temperatures of the respective parts were measured in a state that the temperature of the interior of the projector was sufficiently stabilized.

Figure 9:
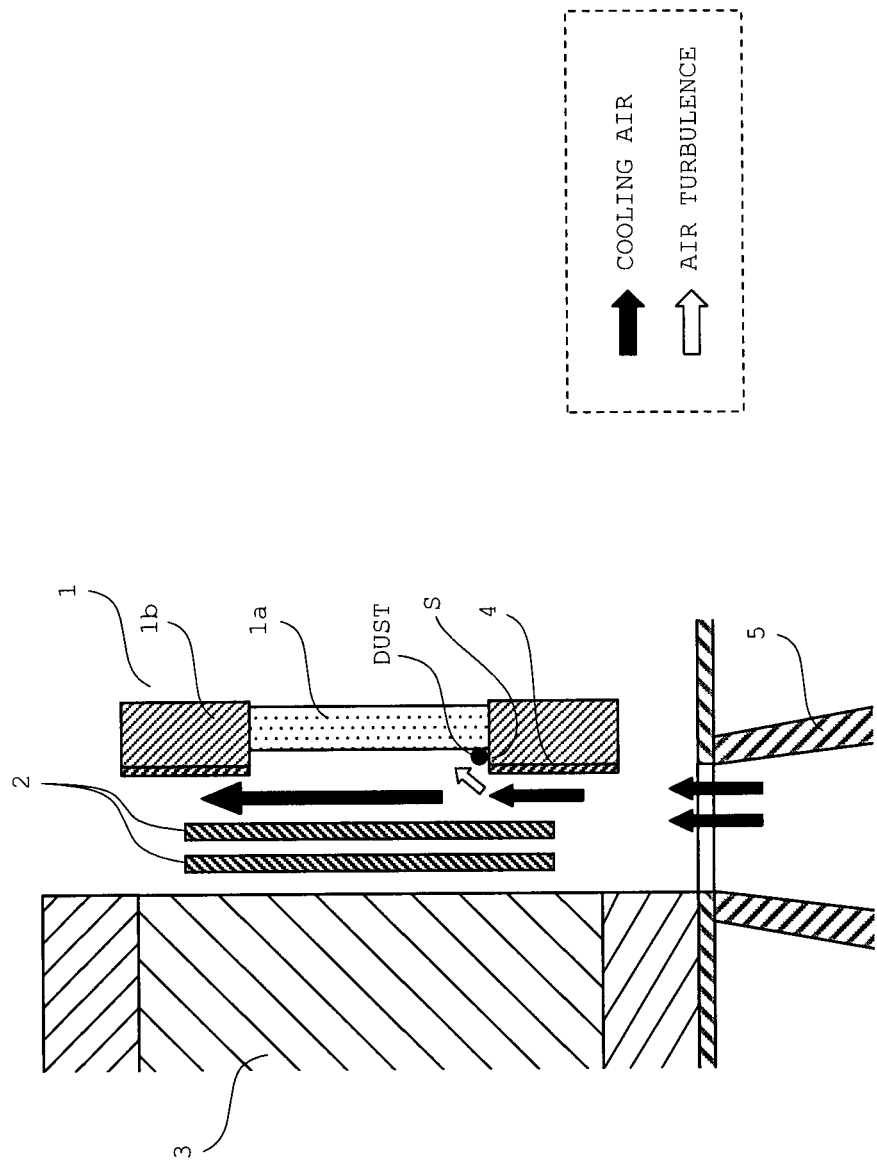
FIG. 9 is a diagram showing an example of a cooling structure for a light modulator and polarizers of the related art.

The comparative example has the arrangement shown in FIG. 9. Similarly to the embodiment, the inventive example has an arrangement, wherein an inclined piece 232b is formed on a bracket 232.

As is obvious from the graph shown in FIG. 7, the temperatures of the light modulators 210, 216, and 225, and the output-side polarizer pairs 213, 219, and 228 are lower in the inventive example than in the comparative example.

Thus, the cooling effect of the embodiment can be confirmed by the measurement result shown in FIG. 7, as well as the aforementioned description on the embodiment.

Figure 8B:
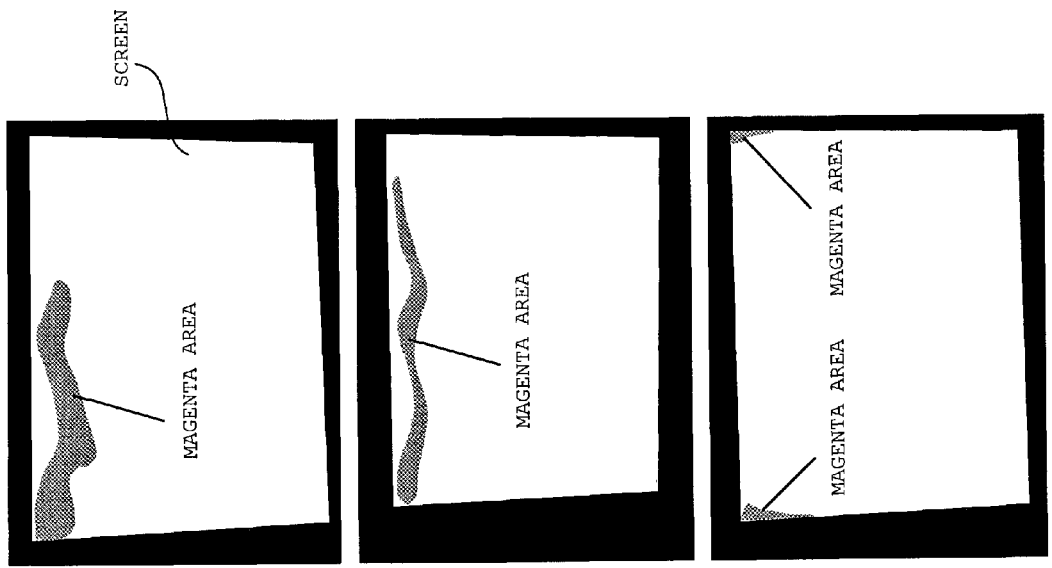
FIGS. 8A and 8B are diagrams showing states of a projected image (perfect white display) after a dust environment test was conducted with respect to the projector, in the case where the cooling structure (inventive example) of the embodiment, and the cooling structure (comparative example) of the related art were used.
Figure 8A:
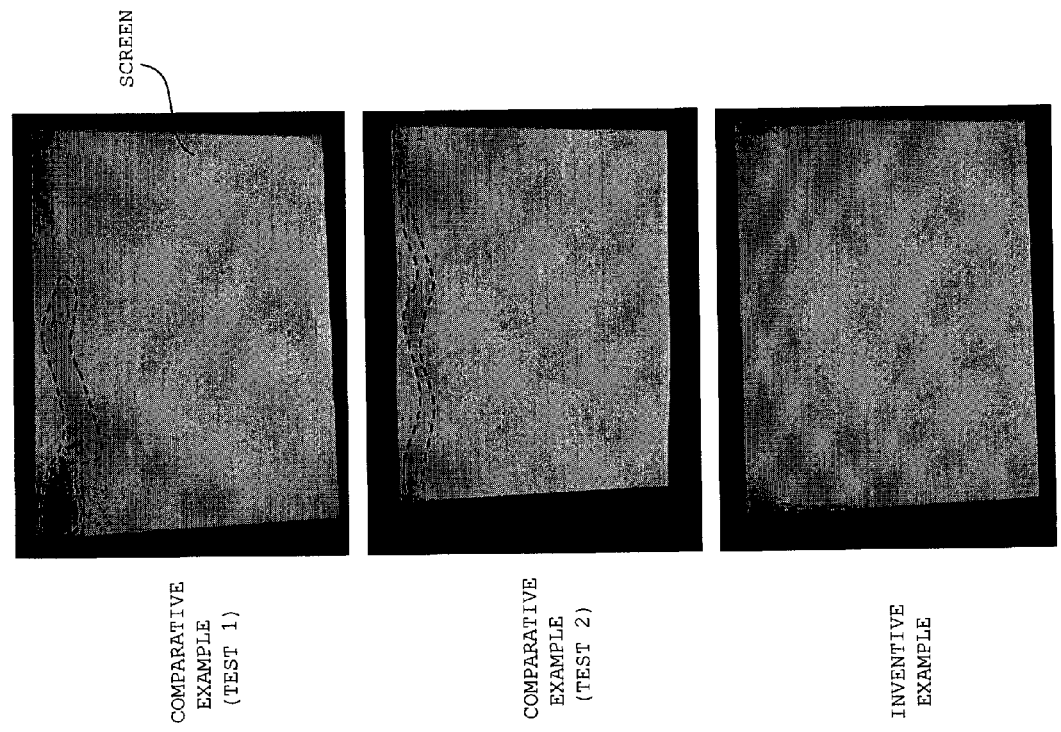

FIGS. 8A and 8B are diagrams showing states of a projected image (perfect white display), after a dust environment test was conducted with respect to the projector, in the case where the cooling structure (inventive example) of the embodiment and the cooling structure (comparative example) of the related art were used. FIG. 8A are photographs showing the states of the projected image, and FIG. 8B are diagrams schematically showing the states of the projected image shown in FIG. 8A. In FIG. 8A, magenta areas are indicated by drawing broken lines on profiles thereof.

The dust environment test was conducted by using a testing apparatus in a dust environment, and the test condition was as follows.
(Test Condition)
room temperature: 20° C.
dust concentration: 20 to 30 mg/m$^3$
kind of dust: fiber dust, dirt
(Dust Laden Condition)
four-hours exposure corresponding to dust laden condition for 4,800 hours
(Test Period)
four hours The test was conducted twice concerning the comparative example, and measurement results on the two comparative examples are shown. The dust environment test was conducted before the final dimensions of the inclined piece 232b were determined. Accordingly, the arrangement of the inventive example is different from the arrangement shown in FIGS. 5A and 5B. Specifically, in the inventive example, the transverse width of the inclined piece 232b was set slightly shorter than the transverse width of the liquid crystal panel 216a.

The dust environment test was conducted by experimentally increasing the flow rate of cooling air with respect to the liquid crystal panel 216a both in the inventive example and the two comparative examples to lower the temperature of the liquid crystal panel 216a of the light modulator 216 whose temperature is supposed to be highest among three light modulators 210, 216 and 225. As a result of increasing the flow rate as described above, in the two comparative examples, dust or a like matter was adhered on a wide area on a lower end of the liquid crystal panel 216a, and discoloration (indicated by the magenta area) appeared in a wide area on an upper end of the projected image resulting from the dust adhesion (image is reversely displayed).

On the other hand, in the inventive example, although slight discoloration (indicated by the magenta area) appeared at two corners on an upper end of the projected image, a wide-area discoloration, which appeared in the comparative examples, was avoided.

In the inventive example, the discoloration at two corners appeared, because the transverse width of the inclined piece 232b was set slightly shorter than the transverse width of the liquid crystal panel 216a. It is conceived that such discoloration at two corners will be avoided in the arrangement in FIGS. 5A and 5B, because the transverse width of the inclined piece 232b is set longer than the transverse width of the liquid crystal panel 216a in the arrangement shown in FIGS. 5A and 5B.

As described above, the effect of preventing image deterioration in the embodiment can be confirmed by the result of the dust environment test shown in FIG. 8, as well as the aforementioned description on the embodiment.

The embodiment of the invention has been described as above, but the invention is not limited to the foregoing embodiment. The embodiment of the invention may be changed or modified in various ways as necessary, as far as such changes and modifications do not depart from the scope of the claims of the invention hereinafter defined.

What is claimed is:
1. A projection display device, comprising:
a light modulator for modulating light from a light source, the light modulator includes a liquid crystal panel, and a frame surrounding a perimeter of the liquid crystal panel, wherein the liquid crystal panel is recessed with respect to the frame, a polarizer disposed at a position facing the light modulator;

a cooling section for allowing an air to flow in a space between the light modulator and the polarizer; and an air deflector for deflecting the air flowing in the space between the light modulator and the polarizer toward the polarizer wherein the air deflector has an inclined portion deflecting air toward the polarizer, and wherein the inclined portion has a trailing edge which is not in contact with the frame, with respect to the direction of air flow, spaced apart from a transition between the frame and the liquid crystal panel, before the transition in the air flow direction, and wherein a transverse width of the inclined portion is set longer than a transverse width of the liquid crystal panel, wherein the air deflector includes a bracket for supporting the light modulator, the bracket being mounted on a surface of the light modulator at a position facing the polarizer, the inclined portion is formed on the bracket, and a leading edge of the inclined portion is in contact with the frame.

2. The projection display device according to claim 1, wherein the transition is a step portion defined between the liquid crystal panel and the frame.

3. The projection display device according to claim 1, wherein the air deflector is operable to deflect the air toward a middle portion of the polarizer.

* * * * *